（12）United States Patent
Dobra et al.

(10) Patent No.: US 9,592,765 B2
(45) Date of Patent: Mar. 14, 2017

(54) LOW-IMPACT CRASH DETECTION SYSTEM (71) Applicant: Quartix Limited, Cambridge (GB)

(72) Inventors: Thomas Dobra, Royal Tunbridge Wells (GB); Jeremy Bentham, Cambridge (GB)

(73) Assignee: Quartix Limited, Cambridge (GB)

( * ) Notice: Subject to any disclaimer, the term of this patent is extended or adjusted under 35 U.S.C. 154(b) by 122 days.

(21) Appl. No.: 14/497,704

(22) Filed: Sep. 26, 2014

(65) Prior Publication Data

US 2015/0091717 A1 Apr. 2, 2015

(30) Foreign Application Priority Data

Sep. 28, 2013 (GB) .................................. 1317257.2
Nov. 12, 2013 (GB) .................................. 1319919.5

(51) Int. Cl.
*B60Q 9/00* (2006.01)
*G07C 5/00* (2006.01)
(Continued)

(52) U.S. Cl.
CPC ............ *B60Q 9/008* (2013.01); *G07C 5/008* (2013.01); *G07C 5/0816* (2013.01); *B60R 21/0132* (2013.01); *G01P 21/00* (2013.01)

(58) Field of Classification Search
CPC ................................................... B60Q 9/0008
(Continued)

(56) References Cited

U.S. PATENT DOCUMENTS 5,285,187 A 2/1994 Hirao et al.
5,431,441 A 7/1995 Okano
(Continued)

FOREIGN PATENT DOCUMENTS

DE 102007033639 A1 1/2009
EP 1000820 A2 5/2000
(Continued)

OTHER PUBLICATIONS

English-language abstract of Japanese Patent No. JP 3118980 B, European Patent Office, Dec. 18, 2000.
(Continued)

*Primary Examiner* — Brent Swarthout
(74) *Attorney, Agent, or Firm* — Dascenzo Intellectual Property Law, P.C.; Ian D. Gates (57) ABSTRACT

There is provided a low-impact crash detection system for a vehicle comprising an accelerometer device from which horizontal components of acceleration are derived, a data processor comprising a FIR bandpass filter to generate filtered horizontal components of acceleration and a communication device for transmitting crash alert information, wherein the data processor is configured to generate an impact energy signal from the filtered horizontal acceleration components, to compare the impact energy signal with a threshold value to determine whether a low-impact crash has taken place, and to generate a crash alert for transmission by the communication device if the threshold value is exceeded. A method of low-impact crash detection is also provided, the method including a crash scoring method.

23 Claims, 3 Drawing Sheets

(51) Int. Cl.
*G07C 5/08* (2006.01)
*B60R 21/0132* (2006.01)
*G01P 21/00* (2006.01)

(58) Field of Classification Search
USPC .................... 340/435, 903, 436; 701/301
See application file for complete search history.

(56) References Cited

U.S. PATENT DOCUMENTS

| | | | |
|---|---|---|---|
| 5,742,506 A | 4/1998 | Kura et al. | |
| 6,095,554 A * | 8/2000 | Foo et al. | 280/735 |
| 6,553,294 B1 * | 4/2003 | Caruso et al. | 280/735 |
| 7,606,646 B2 * | 10/2009 | Higuchi et al. | 340/436 |
| 2004/0051632 A1 * | 3/2004 | Sala | B60R 21/0132 340/436 |
| 2011/0202305 A1 | 8/2011 | Willis et al. | |
| 2013/0267194 A1 | 10/2013 | Breed | |
| 2014/0111354 A1 * | 4/2014 | Hergesheimer | G08C 19/00 340/870.02 |

FOREIGN PATENT DOCUMENTS

| | | |
|---|---|---|
| JP | H0699787 A | 4/1994 |
| JP | 3118980 B | 12/2000 |
| WO | WO 2013/049819 A1 | 4/2013 |

OTHER PUBLICATIONS

Search Report issued in connection with United Kingdom Patent Application No. GB1317257.2, 1 page, United Kingdom Intellectual Property Office, Mar. 24, 2014.

Middleton, Natalie, "Counter insurance scams with telematics, says Quartix," FleetWorld, Aug. 28, 2013, retrieved from the Internet Feb. 13, 2015: URL: https://web.archive.org/web/20130908052323/http://fleetworld.co.uk/ news/2013/ Aug/Counter-insurance-scams-with-telematics-says-Quartix/ 0434010556.

Kirk, Andy, "Telematic-Based Opportunities," Modern Claims Magazine, May 2013, Issue 01, pp. 53-54, retrieved from the Internet Feb. 16, 2015: URL: http://www.modernclaimsmagazine.co.uk/wp-content/uploads/ 2013/06/ MCM1-pdf.pdf.

Search Report issued in connection with European Patent Application No. EP 14186148, 2 pages, European Patent Office, Feb. 23, 2015.

English-language abstract of Japanese Patent Publication No. JP H0699787 A, European Patent Office, Apr. 12, 1994.

English-language abstract of German Patent Application Publication No. DE 102007033639 A1, European Patent Office, Jan. 22, 2009.

* cited by examiner

LOW-IMPACT CRASH DETECTION SYSTEM

RELATED APPLICATIONS

The present application claims priority to United Kingdom Patent Application No. 1317257.2, filed on Sep. 28, 2013, and United Kingdom Patent Application No. 1319919.5, filed on Nov. 12, 2013, the complete disclosures of which are incorporated herein by reference.

FIELD

The present disclosure relates to a system for detecting low-impact crashes, such as those sufficient to cause damage to a vehicle whilst leaving the vehicle still drivable. An associated method of detecting low-impact crashes is also provided.

BACKGROUND

Crash detection systems are often employed to detect a vehicle crash as it is occurring so that safety features such as airbags can be deployed. Such controlling safety systems are often built into the vehicle or they may be part of the functionality of a portable device, such as a smart mobile telephone, which on detecting a crash alerts the emergency services to the crash.

Existing systems are designed to detect moderate to large crashes requiring emergency assistance and in particular vehicle recovery.

For young drivers, often a third party such as an insurer wishes to know whenever an accident has occurred and the severity of the accident. Often damage will occur to the car at low speed, for example whilst parking, and the insurer requires information about the nature of the crash event. It is an aim of the present disclosure to provide a low-impact crash detection system which is of particular use for monitoring new drivers.

SUMMARY

Low-impact crash detection systems for a vehicle comprise an accelerometer device from which horizontal components of acceleration are derived, a data processor comprising a bandpass filter to generate filtered horizontal components of acceleration and a communication device for transmitting crash alert information. The data processor is configured to generate an impact energy signal from the filtered horizontal acceleration components, to compare the impact energy signal with a threshold value to determine whether a low-impact crash has taken place, and to generate a crash alert for transmission by the communication device if the threshold value is exceeded.

Methods of low-impact crash detection comprise acquiring at least horizontal acceleration components from an accelerometer device, filtering horizontal acceleration components using a bandpass filter so as to produce filtered horizontal acceleration components within a frequency range, squaring the amplitude of the filtered horizontal acceleration components to produce an impact energy signal, comparing the impact energy signal with a threshold value to determine whether a low-impact crash has taken place, and providing a crash alert if the threshold value is exceeded.

DESCRIPTION

In accordance with one aspect of the disclosure, there is provided a low-impact crash detection system for a vehicle comprising an accelerometer device from which horizontal components of acceleration are derived, a data processor comprising a bandpass filter to generate filtered horizontal components of acceleration within a set frequency range and a communication device for transmitting alert information, typically to a remote server, wherein the data processor is configured to generate an impact energy signal from the filtered horizontal acceleration components, to compare the impact energy signal with a threshold value to determine whether a low-impact crash has taken place, and to generate a crash alert for transmission by the communication device if the threshold value is exceeded.

The system may further comprise at least one filter means, or filter, configured to generate filtered data for combining with the crash alert information. This enables the crash alert information to be assessed in relation to other characteristics of a vehicle's movement proximal the time at which the crash alert is generated to refine the crash alert information and improve accuracy of notification of crashes to a third party.

The at least one filter means may be configured to apply a plurality of processing rules or variants to acquired data from a vehicle. The filter means may be configured to examine multiple combinations of data parameters associated with the vehicle, such parameters including but not limited to, location, speed, heading, acceleration/G-forces in three axes, engine and ignition status.

The system may further comprise at least one remote server. The remote server may be used for storing and processing received data and may incorporate the aforesaid filter means so that data acquired from a vehicle can be processed remotely from the vehicle.

Preferably the bandpass filter is a FIR filter or an IIR filter so as to reduce noise within the signal being processed.

The FIR filter or IIR filter preferably has a filter band or frequency pass range in the range 0.2 to 40 Hz, more preferably 0.5 to 20 Hz and particularly preferred 2.5 to 7.5 Hz.

The data processor is preferably a 32-bit microprocessor with 16 KB memory.

The threshold value may be set at 0.05 to 30 $g^2$ so as to identify low-impact crashes, although typically the range will be set at 0.07 to 15 $g^2$.

The accelerometer device preferably produces horizontal components relative to the x-axis and y-axis. If desired, separate accelerometer units positioned in different parts of the vehicle may be used to provide the horizontal acceleration components.

The system may further comprise a velocity and/or position measuring device, such as a GPS, to allow the impact energy signal to be compared to a road type. This allows a data processor to perform an additional comparison so that bumpy roads, and in particular those known to have a low average travel speed can have a higher threshold applied before an alert is produced.

Whilst it is possible for the system to use a single set of filter characteristics for all crash detection, it can be advantageous to vary the parameters to optimise the detection. This can be a single optimisation on installation; a large commercial vehicle will have markedly different acceleration characteristics to a sport car, and the filter may be tuned to reflect this. The filter can also be tuned using dynamic conditions; if a velocity and/or position measuring device such as a GPS is fitted, it can be used to determine speed and/or location, and an ignition on/off sensor can be used to determine if the vehicle is parked. These measurements may be directly linked to the crash filter parameters; for example, a parked vehicle could be given greater acceleration-sensitivity than a moving vehicle. There may also be an indirect linkage, where the position-measuring device initiates a database lookup to determine the type of road the vehicle is currently on, and this information is used to adjust the filter parameters; for example, a winding country road may require higher filter thresholds than a motorway.

The system is preferably designed to be readily installed on a car as a retro-fitted module which is of particular use for insurers and the like looking to monitor new drivers.

The accelerometer device may comprise a three-axis accelerometer configured to generate orientation data with the data processor configured to calculate a first rotation to isolate horizontal components of orientation data, calculate a second rotation of the orientation data dependent on acceleration data obtained from the velocity measuring device, and perform the first and second rotations on the orientation data to calibrate the orientation of the accelerometer relative to the moving object.

Typically the accelerometer will be mounted on a vehicle also carrying a velocity measuring device. By calibrating the orientation of the accelerometer using rotations in this way, less data needs to be stored to calibrate the position of the accelerometer relative to the vehicle and calibration can take place faster.

The first and second rotations may be combined to apply a single transformation to the orientation data, which will generally be a gravity vector.

Preferably the processor is configured to identify at least one first value representative of a first angle of orientation of the accelerometer relative to a first axis and at least one second value representative of a second angle of orientation of the accelerometer relative to a second axis, the first axis being orthogonal to the second axis, and to use the first value and the second value to calculate the first rotation. Generally the first angle will be between the gravity vector and an x-axis and the second angle will be between the gravity vector and a z-axis.

Desirably the at least one first value representative of the first angle and the at least one second value representative of the second angle are trigonometric functions only. Typically cosine and sine values will be obtained for the first angle and the second angle as accelerometer data is acquired. Using trigonometric functions instead of calculating the angle itself reduces processor time required and so improves the speed at which calibration can be achieved, with typically calibration being twice as fast when using trigonometric functions as compared to calculating angles. However alternatively the first and second values may be calculated as angles or acquired from look-up tables. If look-up tables are used, then more processing time is needed than when using trigonometrical functions on a comparable processor.

The second rotation is preferably calculated using vector and scalar products of the accelerometer data with acceleration data obtained from the velocity measuring device.

The first and second rotations may be calculated as rotational matrices to be applied to original accelerometer data.

To ensure that data is not acquired unless a journey is being undertaken, the processor may be configured to accumulate orientation data and/or velocity data when moving between 5 km/h up to 80 km/h.

If desired, the processor may accumulate data for a set period of time to smooth noisy data. Typically data will be acquired for one second, this producing sufficient data for accurate calibration of the orientation to take place, but longer or shorter periods may be desired and thus the period of data acquisition may range from 0.2 seconds to one hour.

The velocity measurement device and the accelerometer will typically generate data at different frequencies and accordingly the processor may sample the velocity measurement data and the accelerometer data at different frequencies. Thus, by way of example, the accelerometer may be sampled at 100 Hz and the GPS at 10 Hz.

In accordance with another aspect of the present disclosure, there is provided a method of low-impact crash detection comprising acquiring at least horizontal acceleration components from an accelerometer device, filtering horizontal acceleration components using a bandpass filter so as to produce filtered horizontal acceleration components within a frequency range, squaring the amplitude of the filtered horizontal acceleration components to produce an impact energy signal, comparing the impact energy signal with a threshold value to determine whether a low-impact crash has taken place, and providing a crash alert to a remote user if the threshold value is exceeded.

By filtering the horizontal acceleration components, processing necessary to calculate whether an impact is above or below a threshold value is reduced. Such a method does not assess the precise shape of a crash impact, and therefore does not calculate lots of information about the crash itself, but rather determines whether a threshold is exceeded.

The method may further comprise filtering data obtained from a vehicle and combining with the impact energy signal to adjust the threshold value. This enables the impact energy signal to be assessed in relation to other characteristics of a vehicle's movement proximal a time at which the impact energy signal is generated and so improve accuracy of detection of crashes.

A plurality of processing rules or variants may be applied to acquired data. This will preferably be performed using one or more filter means configured to examine multiple combinations of data parameters associated with the vehicle, such parameters including, but not limited to, location, speed, heading, acceleration/G-forces in three axes, engine and ignition status.

The bandpass filter is preferably an FIR filter or IIR filter so as to improve noise discrimination and prevent the threshold being exceeded by signal noise rather than a crash event.

The FIR filter preferably has a filter band of between 0.2 to 40 Hz, more preferably 0.5 to 20 Hz and more preferably still 2.5 to 7.5 Hz.

The horizontal acceleration components may be acquired as separate x-axis and y-axis components and if appropriate, the x-axis component and y-axis component can be derived from separate single-axis accelerometers.

Preferably the method further comprises square-rooting the squared amplitude, for example by using a Newton-Raphson method, so as to provide an indication of the severity of the crash.

The method may further comprise quantifying the amount by which a threshold is exceeded to provide information about a crash event.

Whilst the method can be performed using solely an accelerometer mounted on a vehicle, if desired the accelerometer may be combined with a velocity detection system, such as a GPS. This is of advantage as it allows the method to further include comparing the impact energy signal with location information, such as a road type, so as to determine whether the crash event represents a true event. Thus by way of example, if the location information from the GPS reveals that the road on which the crash event has taken place is a rough track, then the threshold can be adjusted to take this into account and not trigger an alert. In this way, false event detection can be eliminated.

The disclosure also includes a method of calibrating the orientation of a three-axis accelerometer associated with a moving object, the method comprising acquiring orientation data, such as gravity vector data, from an accelerometer, acquiring velocity data from a velocity measuring device, such as a GPS or car odometer combined with detection of the angle of a vehicle's wheels, supplying the orientation data and velocity data to a data processor, calculating a first rotation to isolate horizontal components of the orientation data, calculating a second rotation of the orientation data dependent on acceleration data derived from the velocity data, and performing the first and second rotations on the orientation data to calibrate the orientation of the accelerometer relative to the moving object.

Typically the accelerometer is mounted on a vehicle.

The first and second rotations may be combined to apply a single transformation to the orientation data.

Desirably the method further comprises identifying at least one first value representing a first angle of orientation of the accelerometer relative to a first axis and identifying at least one second value representing a second angle of orientation of the accelerometer relative to a second axis, the first axis being orthogonal to the second axis, and using the first value and the second value to calculate the first rotation. The first angle is preferably between the gravity vector and an x-axis and the second angle is between the gravity vector and a z-axis.

Desirably the at least one first value representative of the first angle and the at least one second value representative of the second angle are obtained as trigonometric functions only. Typically cosine and sine values will be obtained for the first angle and the second angle as accelerometer data is acquired. Using trigonometric functions instead of calculating the angle itself reduces processor time required and so improves the speed at which calibration can be achieved. However alternatively the first and second values may be calculated as angles or acquired from look-up tables.

The trigonometric functions used are preferably cosines and sines and the method may further comprise calculating the sines and cosines of the angles between the orientation vector and x and z axes by normalising vector components, and calculating the first rotation as a combination of rotation by the first angle about the z-axis followed by a rotation by the second angle about the x-axis.

The second rotation is preferably calculated using vector and scalar products of the accelerometer data with the acceleration data obtained from the velocity measuring device.

The first and second rotations may be calculated as rotational matrices to be applied to the original accelerometer data.

Preferably, the orientation data and/or velocity data is accumulated when moving between 5 km/h up to 80 km/h) and data may be acquired for a set period of time ranging from 0.2 seconds to one hour, and more preferably data is acquired for 0.2 to 5 seconds.

The velocity measurement device and the accelerometer may each be sampled at a different frequency to accommodate different data generation rates of the velocity measurement device and the accelerometer.

If desired, quaternions may be used to find an average three-dimensional rotation and to apply the average rotation to the accelerometer data.

A Newton-Raphson method may be used for performing normalisation of data components.

Figure 1:
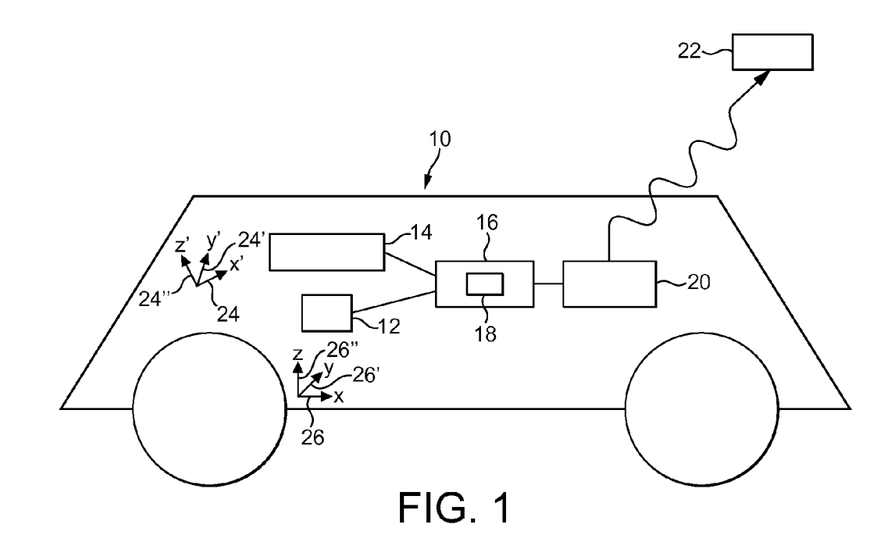
FIG. 1 is a schematic diagram of a crash detection system in accordance with the present disclosure.

A vehicle 10 monitored by a telematics system is shown in FIG. 1 with a velocity measuring device 12 in the form of a GPS and accelerometer 14 mounted on the vehicle at different positions. GPS 12 measures the position of vehicle 10 relative to geo-synchronous satellites from which can be deduced the two-dimensional velocity of the vehicle, i.e. speed and bearing, and where required altitude. Accelerometer 14 is typically a three-axis accelerometer measuring acceleration as a gravity vector made up of components along the x, y and z axes. Both devices 12, 14 acquire data which is passed to firmware comprising processor 16 for processing to identify low-impact crashes, a crash alert being sent via modem 20 to a remote server 22 whenever any low-impact crash is detected. Server 22 comprises recording and processing elements which allow information about the vehicle's movements and crash events to be recorded, and/or processed, and/or monitored, and/or relayed to a third party.

A processor or a server, as used herein, may be any suitable device or devices that are configured to perform the functions discussed herein. For example, a processor or a server may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. Examples of such media include CD-ROMs, disks, hard drives, flash memory, etc. As used herein, storage, or memory, devices and media having computer-executable instructions as well as systems and methods according to the present disclosure are considered to be within the scope of subject matter deemed patentable in accordance with Section 101 of Title 35 of the United States Code.

GPS 12 is optional and an embodiment without a GPS will first be discussed.

Where no GPS is associated with processor 16, accelerometer 14 can be a two-axis accelerometer or multiple accelerometers located on different regions of vehicle 10. The accelerometer data output consists of at least horizontal acceleration components along an x-axis 24 and a y-axis 24'. The location of the accelerometer axes relative to the axes of vehicle 10 is unknown but not required for performance of the disclosure as long as acceleration data is obtained for two orthogonal axes in a horizontal plane.

Figure 2:
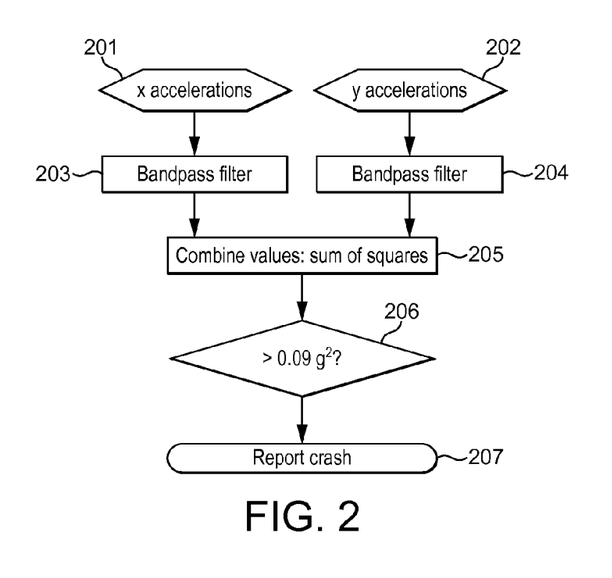
FIG. 2 is a flow chart indicating steps undertaken when detecting low-impact crashes.

When vehicle 10 is moving, accelerometer 14 produces data representing accelerations relative to an x-axis and accelerations relative to a y-axis, see FIG. 2 steps 201 and 202, which are passed to processor 16. Processor 16 is a 32-bit microprocessor with 16 KB of memory which can only support fixed point arithmetic and incorporates a bandpass filter 18 in the form of an FIR filter having a frequency range of 3.5 to 7.5 Hz. The frequency range is selected to ensure major and minor crashes are detected. Whilst an IIR filter is also suitable, an FIR filter is preferred as it has superior properties compared to an IIR filter when detecting half a cycle of a crash oscillation in a signal with noise components. For FIR filter 18, a filter of length 35 works well where accelerometer 14 has a data sampling frequency of 100 Hz although higher sampling frequencies can be accommodated of up to 800 Hz.

FIR filter 18 allows only horizontal components having a frequency in the range 2.5 to 7.5 Hz, see steps 203, 204, to pass to a next processing step 205 where as shown in FIG. 2, the data readings are squared and the squared x accelerations and squared y accelerations combined to give a value which represents the impact energy encountered for any given set of x and y accelerations.

At step 206, the impact energy value is compared to a threshold value, typically set to be in the range 0.05-30 $g^2$, although more preferably as shown at step 206 greater than 0.09 $g^2$. A threshold of 0.09 $g^2$ corresponds to a filter spike of magnitude 0.3 g in any direction, where g is the acceleration due to gravity on the Earth's surface. Travelling along a bumpy road will often generate an impact energy of 0.06 $g^2$ so adopting a threshold above 0.09 $g^2$ avoids considering rough journeys as crashes. If the threshold is exceeded, then processor 16 triggers a crash alert, see step 207, which is communicated via modem 20 to a remote external server 22. This allows external parties, such as insurance providers, to obtain real-time information of when a low-impact crash occurs which is particularly useful for monitoring new drivers.

The present arrangement only passes crash alerts to server 22 if the detected impact energy meets pre-set amplitude and stage/frequency characteristics. The type of crash is not analysed by undertaking complex analysis to identify the shape of the frequency oscillations produced by the crash but rather is a simpler tool looking for when a set impact energy level is exceeded. This allows small amounts of processor capacity to be used for crash detection, typically no more than 1 KB, and ensures acceleration data can be processed quickly as not many processing steps are required to determine whether a threshold is exceeded.

If desired, the processing steps illustrated in FIG. 2 may include square-rooting the sum of squares obtained after step 205 to provide an indication of the severity of the crash. This can be done using a Newton-Raphson method.

By using the crash alert information in combination with information about how vehicle 10 proceeds near the crash, for example by looking at the speed 10 seconds before and after the crash event, it is possible to derive more detailed information about the nature of the crash. For example, if two minutes after the crash the vehicle is a considerable distance away from the crash site, then this indicates the vehicle was simply travelling over a bumpy road surface and no crash took place. If the data subsequent to the crash event shows the vehicle has stopped, this implies the crash was more serious. It is thus possible to use only an accelerometer in a vehicle to give meaningful information about crash events, which avoids the need to rely on a potentially unreliable GPS signal.

To further refine the system, desirably an assessment is made, on a daily basis, of how many false alerts are being submitted by each vehicle tracking system, and a calibration adjustment to the FIR filter algorithm is made to each vehicle tracking system which is too sensitive or which is in a noisy (high vibration) environment. Along with the results from filter 18 in the tracking system, detailed information relating to the vehicle's movement (location, speed, heading, acceleration/g-forces in all three axes, engine and ignition status and the raw data used by the filter) are transmitted to servers 22. This information primarily covers the five seconds before and after the impact, but the tracking system continues to transmit location, speed, heading, engine and ignition status information in the minutes following the crash. From this detailed information, a large number of parameters are derived for use in server-based filtering of the crash alerts. Thus the processing technique above can be combined with information obtained directly from the vehicle or from the GPS device to provide more detail about the nature of the crash event.

Where a velocity and position locating device, such as a GPS, forms part of the telematics system, and as shown in FIG. 1, then the crash alert can be assessed to determine what type of road vehicle 10 is passing over when the alert was generated. For example, when a crash alert is generated and sent from modem 20 to server 22, the alert information can be accompanied with positional information derived from GPS 12. Road-speed databases exist where speed distributions for every section of a road network are stored and updated in real-time. By assessing the vehicle position using a road-speed database giving average real-time speed on all sections of road, server 22 can assess whether vehicle 10 is on a service road, a motorway, a minor road and so on.

If server 22 identifies that vehicle 10 is on a service road, then there is more chance that the crash alert was triggered by vehicle 10 passing over a rough section of road or from loading of the vehicle, rather than a crash having taken place. Monitoring the behaviour of the vehicle after the crash alert will provide additional information. Thus, for example, if vehicle 10 rapidly proceeds to a main road and gains a higher speed, this combined with the crash alert being generated on a service road probably indicates loading of vehicle 10 has taken place.

If the speed distribution on a motorway suddenly slows to very low and a crash alert is generated from vehicle 10 after the average motorway speed reduced, then this indicates vehicle 10 has been in a minor collision, perhaps in part of an accident tailback.

Thus it is possible to quantify by an overall crash score value how likely it is that a crash alert generated from exceeding a low-impact crash threshold relates to a bumpy road surface, loading a vehicle, a minor bump against a post, a small collision with another vehicle and the like. The speeds of vehicle 10 before and after the crash can be used to assess the likelihood of whether a crash has taken place and to adjust the weighting or crash score value awarded to the crash event. In this way, using a crash scoring algorithm can further refine generation of a crash alert, the algorithm taking into account aspects such as the nature of the road, and location and behaviour of a vehicle prior to or following initial triggering of a crash alert.

The crash detection system can be refined further to substantially reduce false crash alerts and improve overall accuracy.

In particular a plurality of data filters can be applied to detect different aspects of a vehicle's characteristics, for example movement, orientation, acceleration, and all filtered data coupled with information relating to the vehicle's movement in the time following the crash to clarify the nature of the detected incident. Typically this extra filtering will take place at remote server 22, with two types of filter applied to the collected data by remote server 22. One data filter relates mainly to the speed characteristics of the vehicle in the period surrounding the crash, and the other filter relates largely to the amplitude, width and area of the acceleration pulse, and any discontinuities in the acceleration/deceleration of the vehicle.

Each of these filters is then coupled with information relating to the vehicle's movement in the minutes following the crash. Each of the two filter-types applies more than 30 variants to look for combinations of the parameters supplied with the crash information which might indicate that a crash has occurred. Each of the variants of each of the filter types are tested at regular intervals, for example every 15 seconds, following the time of the acceleration pulse, i.e. crash alert. This continues until 7 minutes following the pulse. If any of the filter tests passes the applied variants during that time then the alert is immediately passed onto the relevant insurance company as a genuine crash. If no tests pass in the 7 minutes then the crash alert is archived and not passed to the insurance company.

Parameters which are currently monitored as variants within the filters include for the 10 second period surrounding the crash pulse (+/−5 s at is intervals):
1 Maximum speed;
2 Minimum speed;
3 Speed delta—the difference between (1) and (2);
4 Speed delta as a % of maximum speed;
5 Maximum speed loss in any one second;
6 Maximum acceleration amplitude;
7 Maximum acceleration amplitude in the z axis;
8 (7) as a percentage of (6);
9 Acceleration pulse width;
10 Acceleration pulse area;
11 Overall speed profile through the 10 seconds;
12 Speed change/loss in the three, four and three second periods making up the 10 seconds surrounding the crash (speed change a, b and c, respectively);
13 Maximum of difference between speed change a and speed change b and speed change b and speed change c—as a percentage of speed delta;
14 Categorisation of speed change a, b and c in relation to whether they exceed 30% of speed delta in a negative or positive sense. Each segment is therefore categorised as being one of "−", "0" or "+"—depending on whether it represents a speed loss of more than 30% of speed delta in that period ("−"), a speed gain of more than 30% of speed delta ("+"), or somewhere inbetween ("0"). In this way crash alert patterns are categorised as "0+−" or "−0−" or "++−" etc which changes the ways in which other parameters are viewed.

For the 10 seconds surrounding the crash, the filter variants assess:
1 Distance from the crash location 90 seconds later;
2 Whether the ignition has been turned off;
3 At what time the ignition was turned off;
4 At what distance from the crash the ignition was turned off.

Where a three-axis accelerometer is combined with a GPS, the orientation of accelerometer 14 relative to vehicle 10 can be calibrated to provide accurate information on the vehicle acceleration in a horizontal plane.

In FIG. 1, the axes of the accelerometer are shown as x-axis 24, y-axis 24', z-axis 24" with the axes of vehicle 10 being x-axis 26, y-axis 26', z-axis 26". The positive x-axis is considered as the forward direction of vehicle 10, with the x-y plane defined as the vehicle chassis. For accelerometer 14, z-axis 24" is deemed to be the axis producing the highest readings of a gravity vector. The accelerometer axes are offset from the vehicle's axes by an unknown angle.

Figure 3:
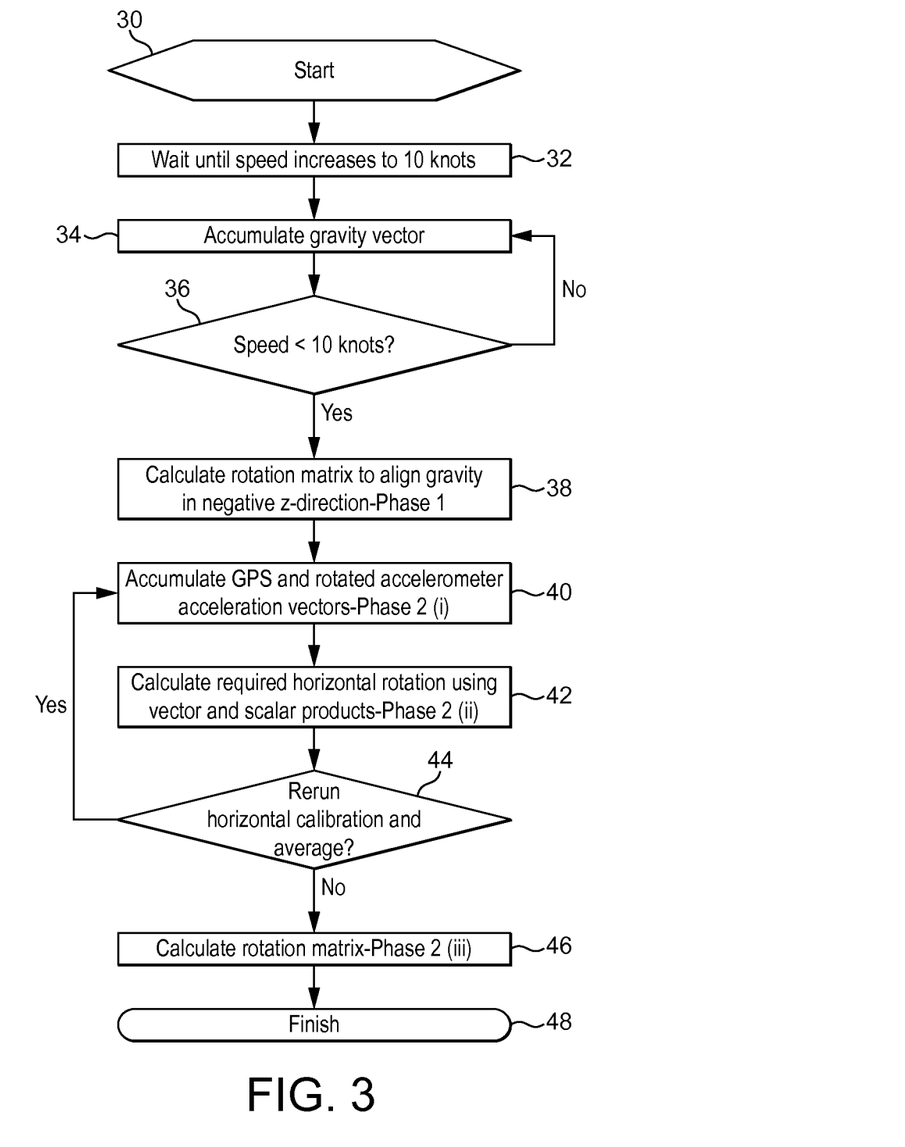
FIG. 3 is a flow chart indicating steps undertaken to calibrate an accelerometer when used with a velocity measuring device.

To calibrate the orientation of accelerometer 14 relative to vehicle 10, a calibration process as shown in outline in FIG. 3 is undertaken by data processor 16. The calibration process involves using the GPS and accelerometer data to calculate rotations in the form of rotational matrices that can be applied to the unprocessed accelerometer data. Data from accelerometer 14 is firstly rotated to isolate components in a horizontal x-y plane which has an unknown alignment to the x-y plane of the vehicle chassis. A second rotation for the accelerometer data is calculated dependent on acceleration data relating to vehicle 10 and calculated from the GPS data, with the axes of the GPS acceleration data defined to be the x and y axes of vehicle 10. Applying the two rotations to the accelerometer data allows the accelerometer data to be calibrated to axes that exactly match the axes of the vehicle, so giving a true acceleration of the car in three dimensions.

The calibration of the accelerometer orientation will now be described in detail with reference to FIG. 3. The new method comprises two phases of calibration: rotating the orientation vector or gravity vector obtained from accelerometer 14 so that the gravity vector points along the down-axis (herein referred to as the negative z-axis); and rotating about a vertical or z-axis in order to produce the correct horizontal accelerations. The steps are typically performed using an algorithm.

Processor 16 accumulates gravity vector readings from accelerometer 14 as long as vehicle 10 exceeds a certain speed and calculates a first rotation that directs each gravity vector reading in the negative z-direction. This is done by calculating a value representative of the angle that the (x, y) components of the gravity vector make with the x-axis and also a value representative of the angle that the gravity vector makes with the z-axis and combining these values to give a first rotational matrix. Processor 16 then calculates the longitudinal and lateral accelerations of vehicle 10 according to the velocity measurement from GPS 12 and calculates a second rotation required about the z-axis to match the direction of horizontal acceleration obtained from the rotated accelerometer data with the acceleration values calculated from the velocity measurements. This is done using the vector and scalar products of the two acceleration vectors obtained from GPS 12 and accelerometer 14. Finally, both first and second rotations are applied to the accelerometer data in order to rotate the original, unrotated accelerometer data to have axes corresponding to that of the vehicle's frame.

The calibration method performed by processor 16 will now be described in detail. When a vehicle engine starts and the ignition is operated, see step 30 of FIG. 3, processor 16 monitors the speed of vehicle 10 using the GPS data and at step 34 begins to accumulate gravity vector data from accelerometer 14. Gravity vector data is only acquired once the speed of vehicle 10 first exceeds a desired speed that indicates the vehicle is likely to continue moving rather than, for example, parking. Once this speed, typically 5 km/h is reached, step 32, and until the speed first falls back below 5 km/h, step 36, the orientation data from accelerometer 14, i.e. the gravity vector data, is accumulated for a period of time, which can range from 0.2 seconds to one hour but will more usually be one second.

The rotation matrix necessary to align the gravity vector in the negative z-direction is then calculated, step 38. This is Phase 1 of the rotations needed for calibration to take place. In Phase 1, the horizontal gravity component and the vertical gravity component are calculated separately. These two components are then rotated to ensure the accelerometer data represents a gravity vector pointing downwards. To calculate the horizontal gravity component, the cosine and sine of an angle α between the horizontal component of the gravity vector and the x-axis are accumulated for each data reading of the gravity vector. Generally the x and y components are normalised so that there is no need to consider the magnitude of the gravity vector and the normalisation factor also outputted in the process, the normalisation factor being equal to the magnitude of the horizontal component of the gravity vector. Calculating trigonometric functions such as the sine and cosine of the angles, rather than finding the angles themselves, is quicker and makes for an easier implementation in fixed point arithmetic, which enables a cheaper processor to be used. Alternatively the angles can be obtained by using lookup tables. If necessary, the impact energy can be assessed at this point and a crash alert triggered.

Once the cosine and sine of the angle representing the horizontal gravity component have been calculated, processor 16 then calculates the cosine and sine of an angle β between the gravity vector and the z-axis, i.e. the vertical gravity component, by normalising the horizontal gravity component with the z component of the gravity vector.

A rotation matrix is then used to invert the direction of gravity for the α and β sine and cosine values. This is done by rotating by $$-\left(\alpha - \frac{\pi}{2}\right)$$

about the z-axis, then by about $$-\left(\beta + \frac{\pi}{2}\right)$$

the new x-axis, so giving a rotation matrix of:

$$\begin{pmatrix} 1 & 0 & 0 \\ 0 & -\sin\beta & \cos\beta \\ 0 & -\cos\beta & -\sin\beta \end{pmatrix} \begin{pmatrix} \sin\alpha & -\cos\alpha & 0 \\ \cos\alpha & \sin\alpha & 0 \\ 0 & 0 & 1 \end{pmatrix} = \begin{pmatrix} \sin\alpha & -\cos\alpha & 0 \\ -\cos\alpha\sin\beta & -\sin\alpha\sin\beta & \cos\beta \\ -\cos\alpha\cos\beta & -\sin\alpha\cos\beta & -\sin\beta \end{pmatrix} \quad \text{Equation 1}$$

The horizontal components of the gravity vector data have thus been identified.

The accelerometer data is then rotated as follows, where Rij are the components of the rotation matrix:

$$\begin{pmatrix} x_R \\ y_R \\ z_R \end{pmatrix} = \begin{pmatrix} R11 & R12 & R13 \\ R21 & R22 & R23 \\ R31 & R332 & R33 \end{pmatrix} \begin{pmatrix} x \\ y \\ z \end{pmatrix} = \begin{pmatrix} xR11 + yR12 + zR13 \\ xR21 + yR22 + zR23 \\ xR31 + yR32 + zR33 \end{pmatrix} \quad \text{Equation 2}$$

This Phase 1 rotation of step 38 ensures the gravity is set to point downwards. Calculating the composition of the horizontal α and vertical β components separately, and then applying them to the data as a single rotation is quicker and so saves on processor time. The exact orientation relative to the x-y axis of vehicle 10 is still unknown.

Processor 16 then undertakes Phase 2 of the calibration. Phase 2 determines the horizontal rotation required to complete the full rotation of the accelerometer data to the vehicle's frame. It compares the accelerations derived from a two-dimensional velocity measuring device, such as GPS 12, with the x and y components of the accelerometer data that has had the Phase 1 rotation applied to it.

Generally the rotated accelerometer data and calculated accelerations will be averaged over a set period, either for a specific time or for a specific number of processing cycles dependent on the frequencies of GPS 12 and accelerometer 14 so as to allow for the accelerometer and velocity measurements to take place at different rates. This smooths noise in the sets of data.

Thus in step 40, processor 16 accumulates GPS data and rotated accelerometer vectors. Accelerations of the GPS data are calculated.

For the two-dimensional velocity data from GPS 12, the longitudinal (x, forward positive) and lateral (y, left positive) accelerations of the vehicle xAcc and yAcc are calculated as follows, where data is obtained as speed v and heading θ from a GPS, and t(n) is the time that the $n^{th}$ velocity sample [v(n), θ(n)] was taken:

$$xAcc = \frac{v(n) - v(n-1)}{t(n) - t(n-1)} \quad \text{Equation 3}$$

$$yAcc = -v(n) \times \frac{\theta(n) - \theta(n-1)}{t(n) - t(n-1)} \quad \text{Equation 4}$$

The minus sign in the expression for the y-acceleration indicates increasing θ corresponds to accelerating to the right.

Two values of acceleration data for GPS 12 and accelerometer 14 are acquired at each sampling point and these are accumulated for one second, subject to the speed of the vehicle being between 5 km/h and 80 km/h at the start of the one second period. This overcomes two potential problems: it smooths noisy data; and it enables the velocity measurement device to be sampled at a different frequency to the accelerometer. Often a GPS will generate data at a frequency of around 10 Hz and an accelerometer around 100 Hz.

At the end of the accumulation period, the horizontal rotation of the accelerometer data required to match the directions of the two accumulated vectors is calculated using the vector and scalar products, step 42. Where φ is the angle of said rotation about the z-axis, 'velAcceleration' is the acceleration vector of vehicle 10 and 'accelerometer' is the gravity vector from accelerometer 14 then:

|accelerometer×
velAcceleration|=|accelerometer||velAcceleration|
sin φ                                             Equation 5 accelerometer·velAcceleration=|accelerometer||velAcceleration|
cos φ                                             Equation 6

Normalising the scalar product with the vector product produces the cosine and sine of the angle of rotation φ. By accumulating the sine and cosine of the horizontal rotation angle, rather than the angle itself, processing power is reduced as using the angle itself would generate discontinuities at 360° and require more processing power.

This calculation is repeated on sequential data readings, preferably until at least 128 values of cos φ and sin φ have been accumulated for ease of processing. With a suitable processor, the calculation could be undertaken once only, rather than being repeated for a number of times.

These accumulated values are normalised to produce estimates for cos φ and sin φ, i.e. horizontal orientation of GPS relative to horizontal (x-y) orientation of accelerometer. The required horizontal calibrations can be averaged over a series of calibration calculations, step 44. A final rotation matrix is then calculated, step 46, as follows, where Hij are the components of the rotation matrix found at the end of Phase 1:

$$\begin{pmatrix} R11 & R12 & R13 \\ R21 & R22 & R23 \\ R31 & R32 & R33 \end{pmatrix} = \begin{pmatrix} \cos\varphi & -\sin\varphi & 0 \\ \sin\varphi & \cos\varphi & 0 \\ 0 & 0 & 1 \end{pmatrix} \begin{pmatrix} H11 & H12 & 0 \\ H21 & H22 & H23 \\ H31 & H32 & H33 \end{pmatrix} \quad \text{Equation 7}$$

$$= \begin{pmatrix} H11\cos\varphi - & H12\cos\varphi - & -H23\sin\varphi \\ H21\sin\varphi & H22\sin\varphi & \\ H11\sin\varphi + & H12\sin\varphi + & H23\cos\varphi \\ H21\cos\varphi & H22\cos\varphi & \\ H31 & H32 & H33 \end{pmatrix}$$

The calibration is now complete, step 48. The original accelerometer data is rotated in the way described at Equation 2 and is now calibrated to the orientation of vehicle axes 26, 26', 26'', so giving a final equation:

$$\begin{pmatrix} x_R \\ y_R \\ z_R \end{pmatrix} = \begin{pmatrix} B11 & B12 & B13 \\ B21 & B22 & B23 \\ B31 & B32 & B33 \end{pmatrix} \begin{pmatrix} A11 & A12 & A13 \\ A21 & A22 & A23 \\ A31 & A32 & A33 \end{pmatrix} \begin{pmatrix} x \\ y \\ z \end{pmatrix} \quad \text{Equation 8}$$

$$= \begin{pmatrix} B11 & B12 & B13 \\ B21 & B22 & B23 \\ B31 & B32 & B33 \end{pmatrix} \begin{pmatrix} xA11 & yA12 & zA13 \\ xA21 & yA22 & zA23 \\ xA31 & yA32 & zA33 \end{pmatrix}$$

$$= \begin{pmatrix} (xA11 + yA12 + zA13)B11 + \\ (xA21 + yA22 + zA23)B12 + \\ (xA31 + yA32 + zA33)B13 \\ (xA11 + yA12 + zA13)B21 + \\ (xA21 + yA22 + zA23)B22 + \\ (xA31 + yA32 + zA33)B23 \\ (xA11 + yA12 + zA13)B31 + \\ (xA21 + yA22 + zA23)B32 + \\ (xA31 + yA32 + zA33)B33 \end{pmatrix}$$

Undertaking the above processing steps for calibration of accelerometer 14 uses approximately 1 KB of the 16 KB of processor 16.

If not done already, an assessment of the impact energy can thus be undertaken and a crash alert triggered if appropriate.

When undertaking the processing steps, and when normalising the respective component of the gravity vector by calculating square roots, typically a Newton-Raphson method will be used to find the square root of x. Thus working in fixed point arithmetic, one takes a first guess $y_0$ of 2^{bit length of x}; then iterate three times using:

$$y_{n+1} = \left(y_n + \frac{x}{y_n}\right) \div 2 \quad \text{Equation 9}$$

For accuracy, generally 4 bits to the right of the decimal point will be used when using 32-bit fixed point arithmetic. To increase processing speed, bit-shifting is used whenever multiplying or dividing by a power of 2. For the outputted sine and cosine, it is recommended to use 10-bits to the right of the decimal point.

Figure 4:
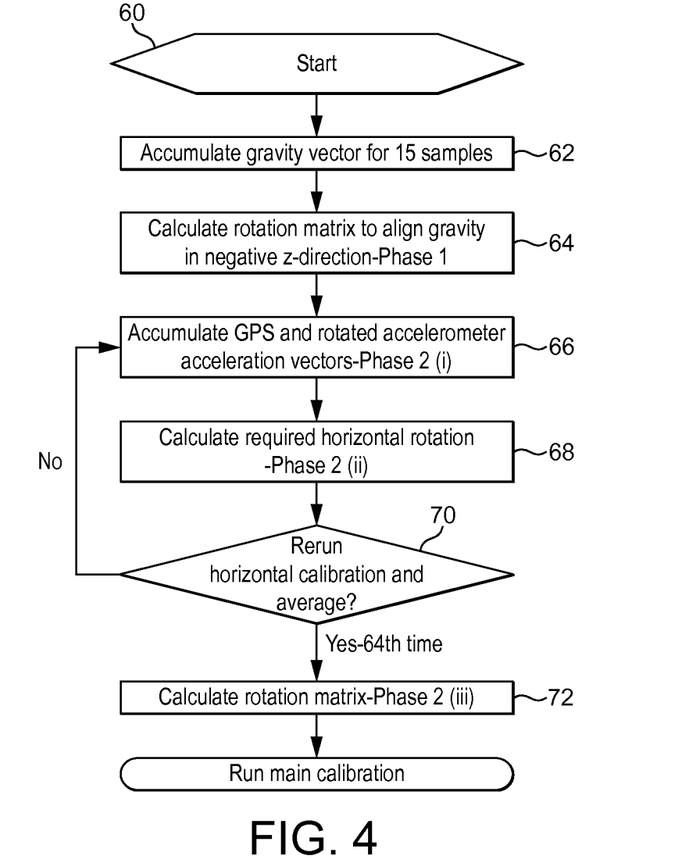
FIG. 4 is a flow chart illustrating steps undertaken to run an initial calibration of the accelerometer.

When a telematics unit comprising GPS 12, accelerometer 14, processor 16 and modem 20 is newly installed with no prior calibrations, it is desirable to obtain results quickly with a satisfactory level of accuracy and the initial calibration is adjusted, see FIG. 4. After starting, step 60, the gravity vector is measured at rest for 15 samples initially, step 62, to complete the Phase 1 calibration, step 64. Then a Phase 2 calibration is completed as above, steps 68 to 72, except for undergoing 64 acquisitions of both cos φ and sin φ rather than 128. This allows rotated data to be outputted as soon as possible.

The gravity vector can be accumulated over subsequent calibrations, although in this case exponential forgetting is ideally used to prevent overflow in fixed point arithmetic and to place appropriate weight on more recent calibrations in case the orientation of accelerometer 14 changes relative to vehicle 10.

Instead of accumulating the gravity vector, cos φ and sin φ between successive calibrations, the rotation outputted from the method can be converted to a quaternion. These quaternions are then averaged, with or without exponential forgetting, and renormalised (since rotation quaternions have unit magnitude) to produce an output quaternion, which is to be interpreted as its corresponding rotation. The accelerometer data can then be rotated by this rotation, preferably using a rotation matrix, but any other method may be executed.

Any of the accumulating stages of Phase 2 can be omitted, although this is likely to produce less accurate results.

The method described above is equally applicable to other systems such as GPS navigation systems assisted by an accelerometer.

The invention claimed is:

1. A low-impact crash detection system for a vehicle comprising an accelerometer device from which horizontal components of acceleration are derived, a data processor comprising a bandpass filter to generate filtered horizontal components of acceleration in a frequency range 2.5 to 7.5 Hz corresponding to a low-impact crash that leaves a vehicle drivable, and a communication device for transmitting crash alert information, wherein the accelerometer device comprises a three-axis accelerometer configured to generate orientation data, and wherein the data processor is configured to:
calculate a first rotation to isolate horizontal components of orientation data;
calculate a second rotation of the orientation data dependent on acceleration data obtained from a velocity measuring device;
perform the first and second rotations on the orientation data to calibrate the orientation of the three-axis accelerometer relative to an associated moving object; and
generate an impact energy signal from the filtered horizontal acceleration components, to compare the impact energy signal with a threshold value to determine whether a low-impact crash has taken place, and to generate a crash alert for transmission by the communication device if the threshold value is exceeded.

2. The low-impact crash detection system according to claim 1, further comprising at least one filter means configured to generate filtered data for combining with the crash alert information.

3. The low-impact crash detection system according to claim 2, wherein the at least one filter means is configured to apply a plurality of processing rules or variants to acquired data from a vehicle.

4. The low-impact crash detection system according to claim 1, further comprising at least one remote server.

5. The low-impact crash detection system according to claim 1, wherein the bandpass filter is a FIR filter or an IIR filter.

6. The low-impact crash detection system according to claim 1, wherein the threshold value is set at 0.05 to 30 $g^2$.

7. The low-impact crash detection system according to claim 1, wherein the first and second rotations are combined to apply a single transformation to the orientation data.

8. The low-impact crash detection system according to claim 1, wherein the second rotation is calculated using vector and scalar products of the accelerometer data with acceleration data obtained from the velocity measuring device.

9. The low-impact crash detection system according to claim 1, wherein the first and second rotations are calculated rotational matrices to be applied to original data.

10. The low-impact crash detection system according to claim 1, wherein the velocity measuring device and the accelerometer device are each sampled at a different frequency.

11. The low-impact crash detection system according to claim 1, wherein the data processor is configured to accumulate one or both of orientation data and velocity data when moving between 5 km/h and 80 km/h.

12. The low-impact crash detection system according to claim 1, wherein the data processor accumulates data for a set period of time.

13. A method of low-impact crash detection comprising:
acquiring at least horizontal acceleration components from an accelerometer device, wherein the accelerometer device is a three-axis accelerometer;
acquiring orientation data from the three-axis accelerometer;
acquiring velocity data from a velocity measuring device;
calculating a first rotation to isolate horizontal components of the orientation data;
calculating a second rotation of the orientation data dependent on acceleration data derived from the velocity data;
performing the first and second rotations on the orientation data to calibrate the orientation of the three-axis accelerometer relative to an associated moving object;
filtering horizontal acceleration components using a bandpass filter so as to produce filtered horizontal acceleration components within a frequency range 2.5 to 7.5 Hz corresponding to a low-impact crash that leaves a vehicle drivable;
squaring the amplitude of the filtered horizontal acceleration components to produce an impact energy signal;
comparing the impact energy signal with a threshold value to determine whether a low-impact crash has taken place; and
providing a crash alert if the threshold value is exceeded.

14. The method of low-impact crash detection according to claim 13, further comprising filtering data obtained from a vehicle and combining with the impact energy signal to adjust the threshold value.

15. The method of low-impact crash detection according to claim 14, further comprising applying a plurality of processing rules or variants to acquired data.

16. The method of low-impact crash detection according to claim 13, further comprising setting the threshold value between 0.05 to 30 $g^2$.

17. The method of low-impact crash detection according to claim 13, further comprising quantifying the amount by which a threshold value is exceeded to provide information about a crash event.

18. The method of low-impact crash detection according to claim 13, further comprising combining the first and second rotations to apply a single transformation to the orientation data.

19. The method of low-impact crash detection according to claim 13, further comprising identifying at least one first value representing a first angle of orientation of the accelerometer device relative to a first axis and identifying at least one second value representing a second angle of orientation of the accelerometer device relative to a second axis, the first axis being orthogonal to the second axis, and using the first value and the second value to calculate the first rotation.

20. The method of low-impact crash detection according to claim 13, further comprising accumulating one or both of orientation data and velocity data when moving between 5 km/h and 80 km/h.

21. The method of low-impact crash detection according to claim 13, further comprising accumulating data for a set period of time.

22. The method of low-impact crash detection according to claim 13, further comprising sampling each of the velocity measurement device and the accelerometer device at a different frequency.

23. The method of low-impact crash detection according to claim 13, further comprising using a crash scoring algorithm to modify when the crash alert is generated.

* * * * *